(12) United States Patent
Gupta et al.

(10) Patent No.: US 12,543,137 B2
(45) Date of Patent: Feb. 3, 2026

(54) WIRELESS NETWORK AND METHODS OF RECOVERING NETWORK SERVICES AFTER RESTART OF UDR FUNCTION

(71) Applicant: Samsung Electronics Co., Ltd., Suwon-si (KR)

(72) Inventors: Varini Gupta, Bangalore (IN); Narendranath Durga Tangudu, Bangalore (IN); Rajavelsamy Rajadurai, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 18/284,742

(22) PCT Filed: Mar. 31, 2022

(86) PCT No.: PCT/KR2022/004582
§ 371 (c)(1),
(2) Date: Sep. 28, 2023

(87) PCT Pub. No.: WO2022/211515
PCT Pub. Date: Oct. 6, 2022

(65) Prior Publication Data
US 2024/0188020 A1 Jun. 6, 2024

(30) Foreign Application Priority Data

Mar. 31, 2021 (IN) .............................. 202141014988
Mar. 4, 2022 (IN) .............................. 202141014988

(51) Int. Cl.
*H04W 60/00* (2009.01)
*H04W 12/06* (2021.01)

(52) U.S. Cl.
CPC ........... *H04W 60/00* (2013.01); *H04W 12/06* (2013.01)

(58) Field of Classification Search
CPC ....... H04W 12/06; H04W 24/04; H04W 8/30; H04W 60/00
See application file for complete search history.

(56) References Cited

U.S. PATENT DOCUMENTS 11,240,719 B2 2/2022 Park et al.
11,375,407 B2 6/2022 Xu
(Continued)

FOREIGN PATENT DOCUMENTS

WO 2019/098745 A1 5/2019
WO 2019/101176 A1 5/2019
(Continued)

OTHER PUBLICATIONS

NTT DOCOMO; Restoration of profiles related to UDR; 3GPP TSG-CT WG4 Meeting #101e; C4-205420; Nov. 3-13, 2020; Oct. 26, 2020; Meeting.
(Continued)

*Primary Examiner* — Muhammad N Edun
(74) *Attorney, Agent, or Firm* — Jefferson IP Law, LLP

(57) ABSTRACT

The present disclosure relates to a method in a wireless network, the method comprising: receiving, by a Unified Data Repository (UDR) entity (500), information associated with an Access and Mobility Management Function (AMF) entity (200) from a Unified Data management (UDM) entity (400), when the UDM entity (400) receives a registration procedure from the AMF entity (200), wherein the registration procedure comprises timestamp information associated with a User Equipment (UE) (100); and allowing, by the UDR entity (500), to overwrite the information associated with the AMF entity (200) upon determining that the time- (Continued)

stamp information is same as a previously stored timestamp information.

12 Claims, 7 Drawing Sheets

(56) References Cited

U.S. PATENT DOCUMENTS

| | | | |
|---|---|---|---|
| 11,678,252 B2 | 6/2023 | Dao et al. | |
| 2020/0053554 A1* | 2/2020 | Kim | H04W 60/00 |
| 2022/0030495 A1 | 1/2022 | Qiao et al. | |
| 2023/0354007 A1* | 11/2023 | Garcia Martin | H04W 48/18 |
| 2023/0413060 A1* | 12/2023 | Baskaran | H04L 9/3297 |
| 2024/0022908 A1* | 1/2024 | Baskaran | H04W 12/069 |

FOREIGN PATENT DOCUMENTS

| | | |
|---|---|---|
| WO | 2019/120696 A1 | 6/2019 |
| WO | 2020/069662 A1 | 4/2020 |
| WO | 2021/007447 A1 | 1/2021 |

OTHER PUBLICATIONS

Nokia et al.; Discussion on NRF APIs extensions to support NF (Service) Set Profiles; 3GPP TSG-CT WG4 Meeting #101e; C4-205146; Nov. 3-13, 2020; Oct. 26, 2020; E-Meeting.

Nokia et al.; AMF Management; SA WG2 Meeting #137E; S2-2002425; (revision of S2-19yyyyy); Feb. 24-27, 2020; Feb. 29, 2020; Elbonia.

3GPP; 3rd Generation Partnership Project; Technical Specification Group Core Network and Terminals; 5G System; Unified Data Management Services; Stage 3 (Release 17); 3GPP TS 29.503; V17.2.0; (Mar. 2021); Mar. 30, 2021; Valbonne, France.

Samsung; Updates to KI#1 for restoring AUSF Instance Information for SoR/UPU; 3GPP TSG-CT WG4 Meeting #103-e; C4-212468; Revision of C4-212199; Apr. 14-23, 2021; Apr. 21, 2021; E-Meeting.

Samsung; Solution to handle Nudm_UECM_Registration without Authentication Status; 3GPP TSG-CT WG4 Meeting #103-e; C4-212202; Apr. 14-23, 2021; Apr. 6, 2021; E-Meeting.

Samsung; New Key Issue on Handling Nudm_UECM without Authentication Status; 3GPP TSG-CT WG4 Meeting #103-e; C4-212201; Apr. 14-23, 2021; Apr. 6, 2021; E-Meeting.

Samsung; Solution to prevent latest UECM data overwrite; 3GPP TSG-CT WG4 Meeting #103-e; C4-212200; Apr. 14-23, 2021; Apr. 6, 2021; E-Meeting.

3GPP; 3rd Generation Partnership Project; Technical Specification Group Core Network and Terminals; 5G System; Restoration Procedures (Release 17); 3GPP TS 23.527; V17.4.0; (Jun. 2022); Jun. 23, 2022; Valbonne, France.

3GPP; 3rd Generation Partnership Project; Technical Specification Group Core Network and Terminals; 5G System; Restoration Procedures (Release 17); 3GPP TS 23.527; V17.6.0; (Dec. 2022); Dec. 15, 2022; Valbonne, France.

Indian Office Action dated Jan. 20, 2023; Indian Appln. No. 202141014988.

International Search Report with Written Opinion dated Jul. 6, 2022; International Appln. No. PCT/KR2022/004582.

* cited by examiner

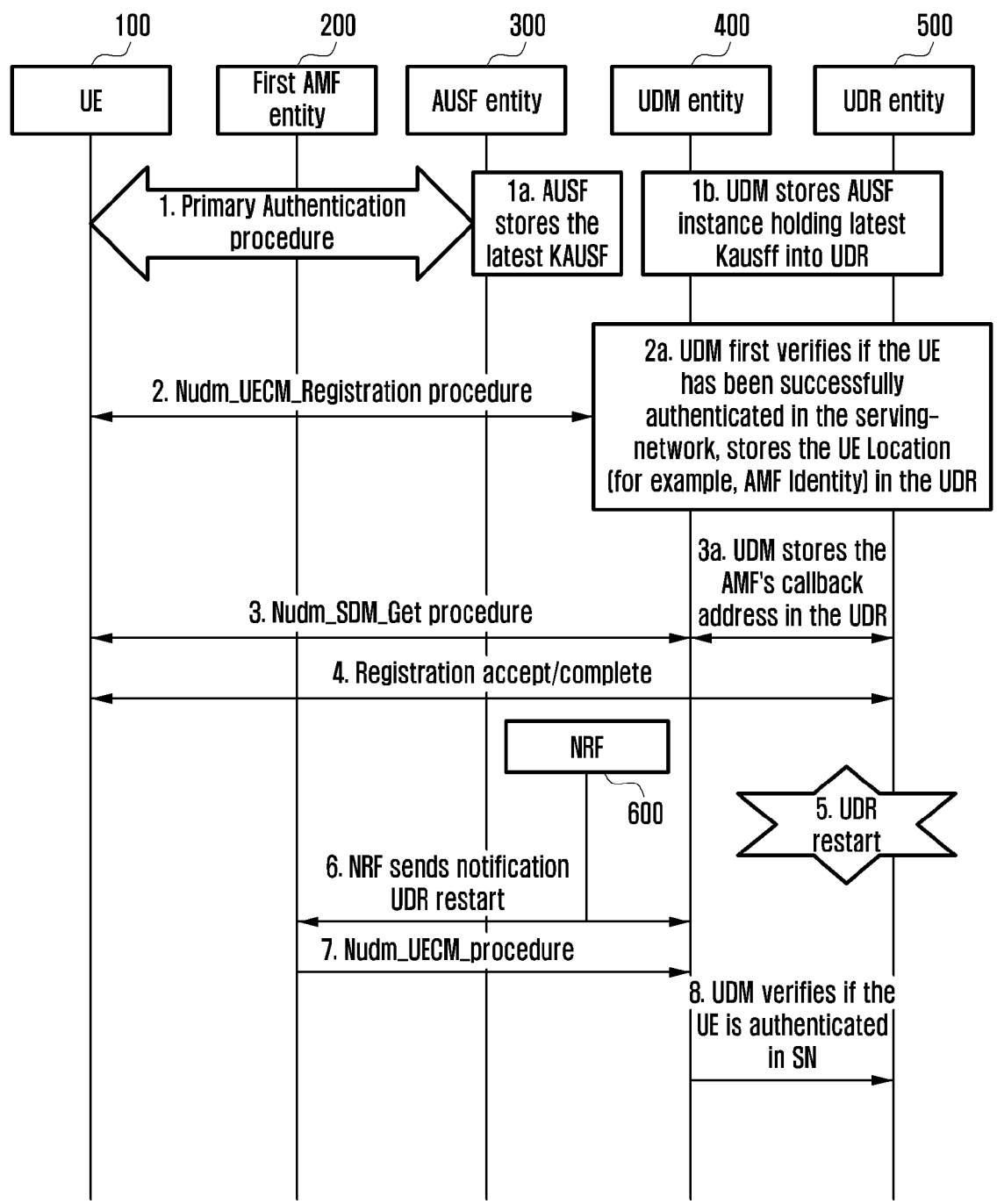

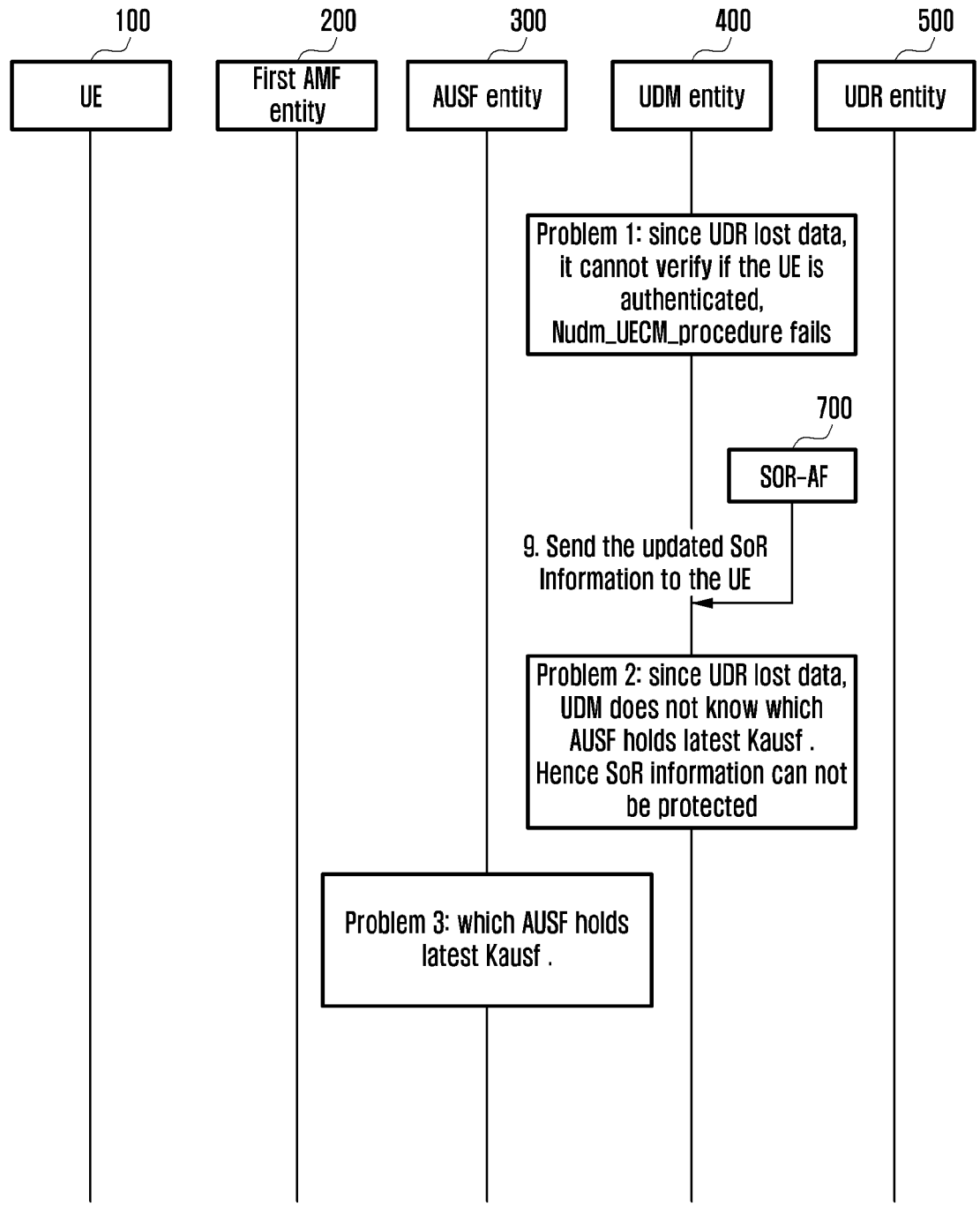

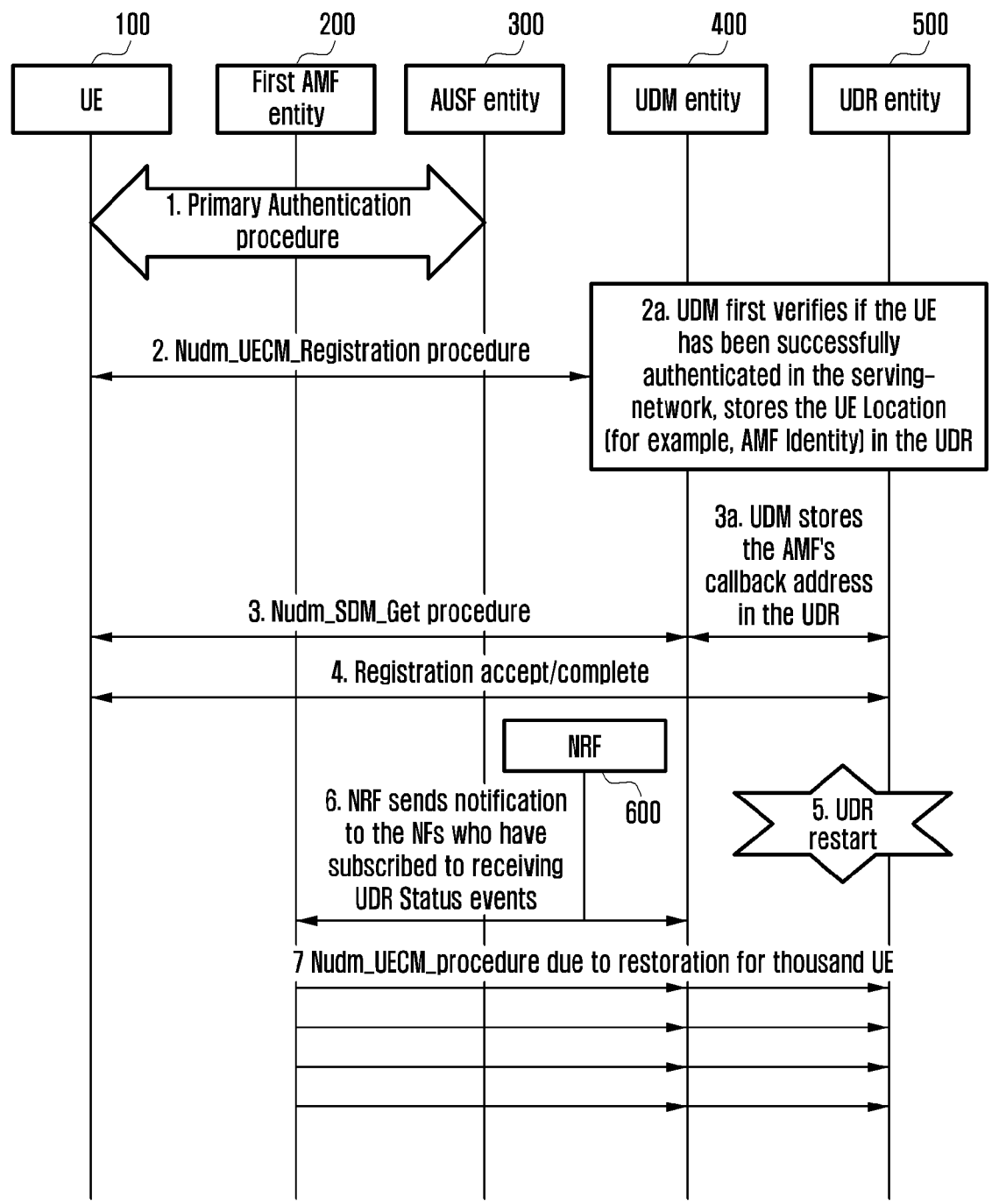

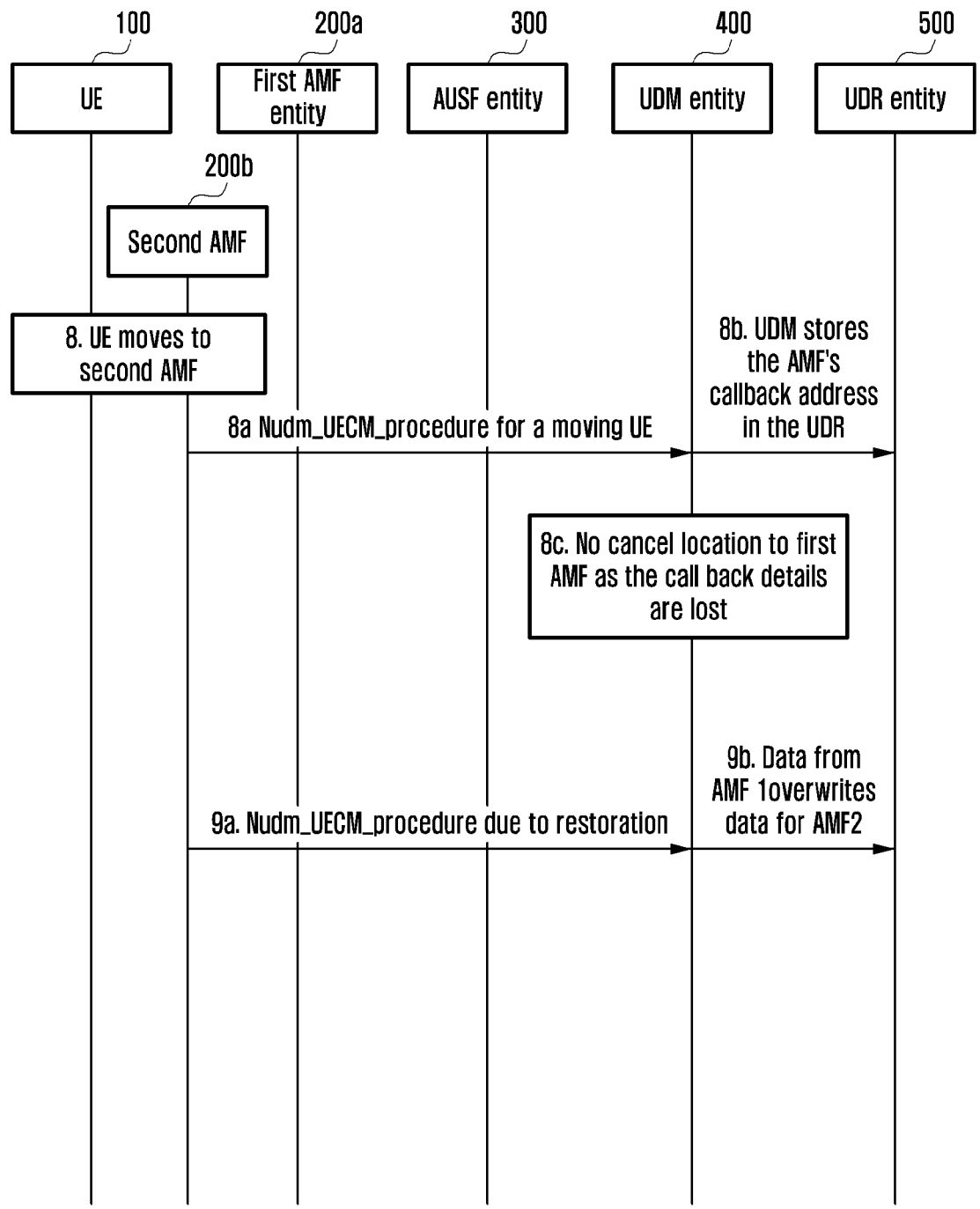

[Fig. 3]
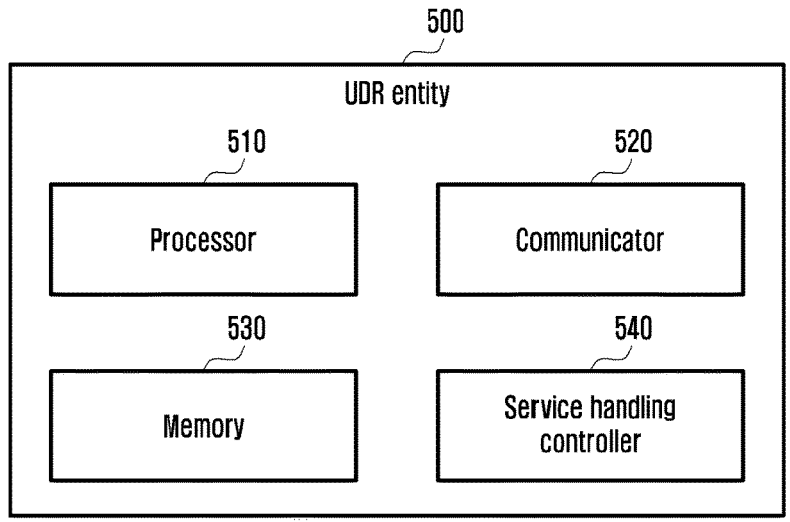
[Fig. 4]
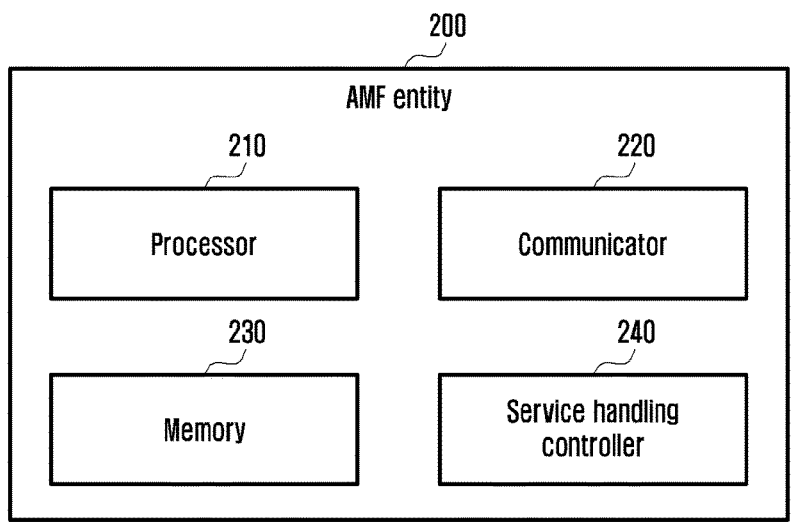
[Fig. 5]
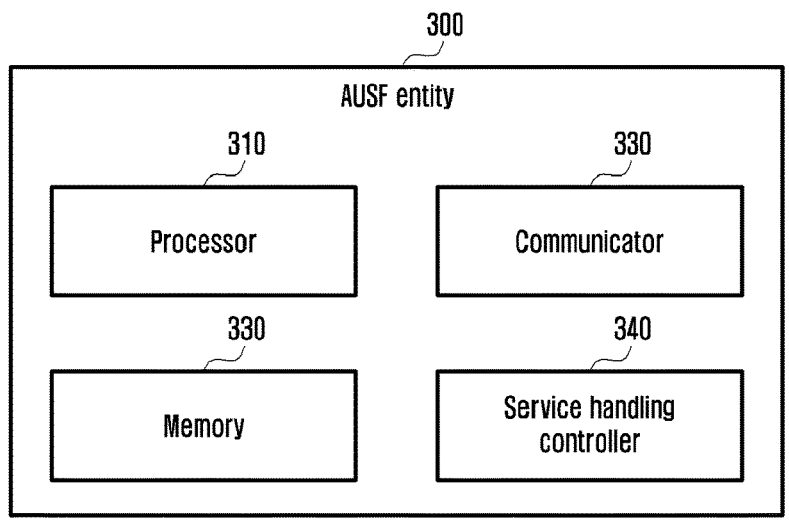

[Fig. 6]
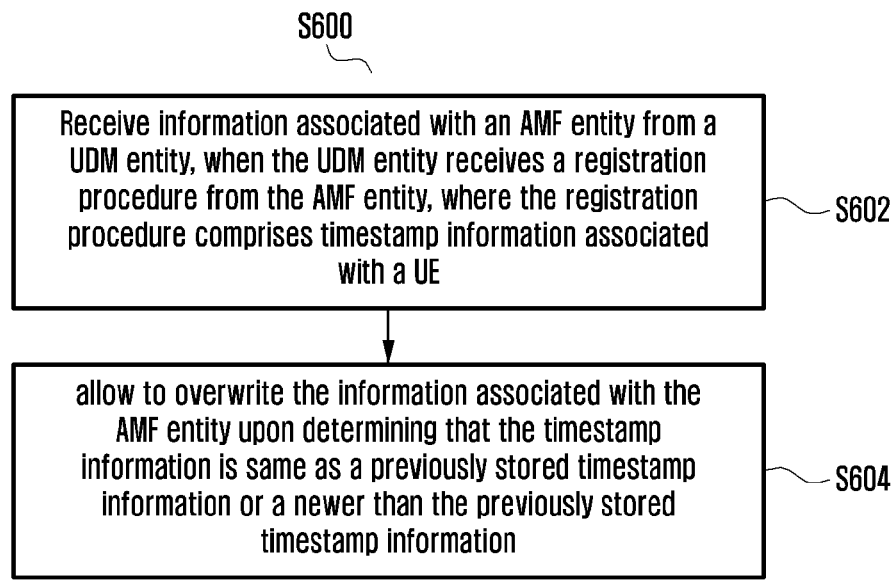
[Fig. 7]
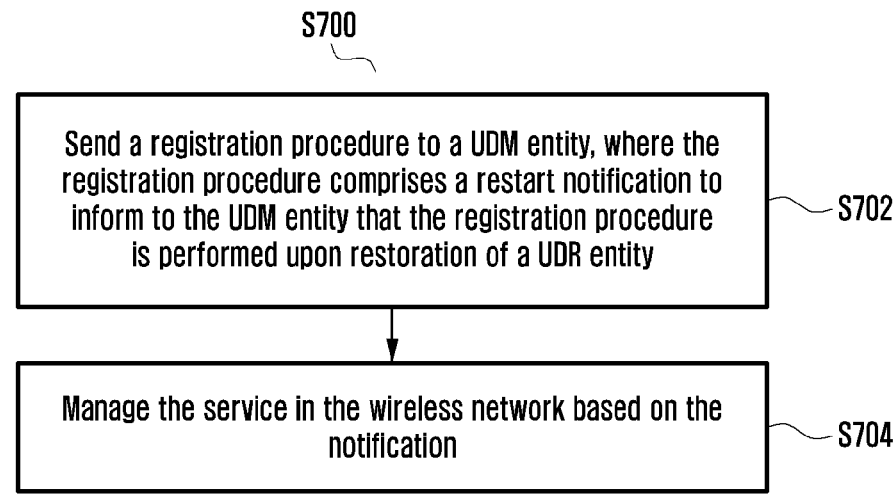

[Fig. 8]
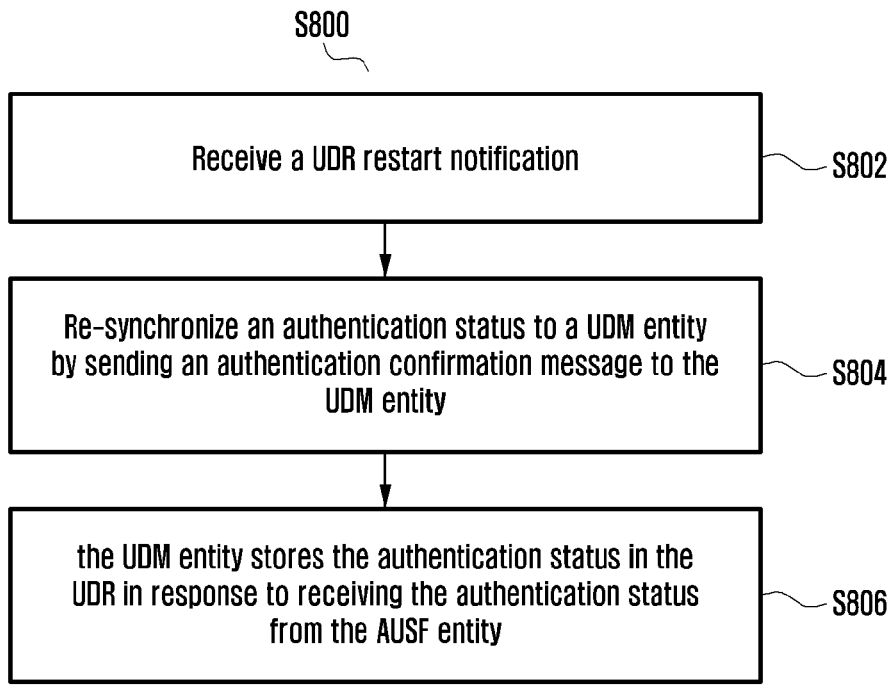
[Fig. 9]
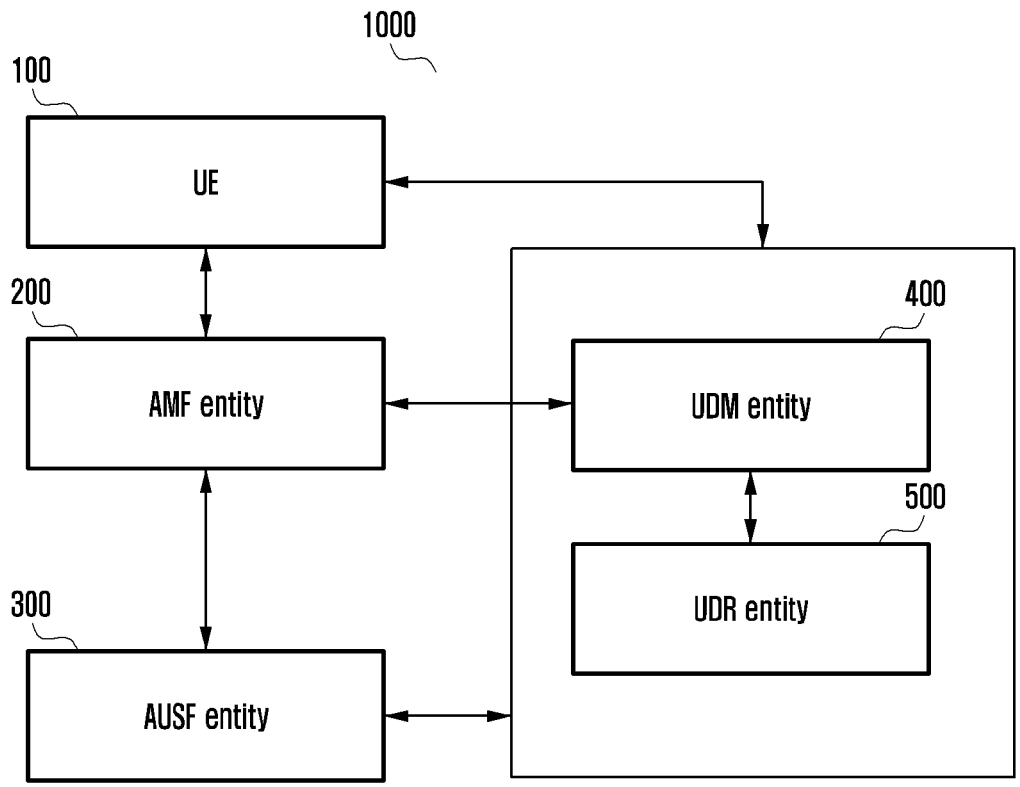

WIRELESS NETWORK AND METHODS OF RECOVERING NETWORK SERVICES AFTER RESTART OF UDR FUNCTION

TECHNICAL FIELD

Embodiments disclosed herein relate to wireless telecommunication networks based on 3rd Generation Partnership Project (3GPP) specifications, and more particularly to systems and methods of recovering network services after restart of a Unified Data Repository (UDR) function.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE OF INVENTION

Technical Problem

The principal object of the embodiments herein is to disclose recovery of UE's authentication status so as to allow the AMF entity to re-synchronize its data with the UDR after restart.

Another object of the embodiments herein is to describe how the UDR can be prevented from overwriting location data due to recent UE movement by the old location data being updated due to the UDR restoration.

Another object of the embodiments herein in to describe how AUSF can re-synchronize its data in UDR so that SoR and UPU services can be re-stored after the UDR restart.

Another object of the embodiments herein in to provide that an AUSF entity needs to be recipient of UDR restart notifications. Thus, whenever the AUSF entity receives UDR restart notification, it can re-register the Authentication Status into UDM entity by sending Nudm_UEAuthentication_Authentication Confirmation as specified in 3GPP TS 29.503. The AUSF entity may include an indication that this re-confirmation is due to UDR restart notification.

Another object of the embodiments herein in to provide that when the UDM entity provides authentication status data to the UDR entity after restart, the UDR entity verifies if the authentication data it is overwriting for a given access (3gpp or non-3gpp) is newer than the one already stored. If not, it rejects the data.

Another object of the embodiments herein in to provide that when the AMF entity performs Nudm_UECM_Registration procedure due to UDR restoration, it includes a timestamp, e.g. of last radio contact with the UE. With this information, when the UDM entity stores the AMF details in the UDR entity, the UDR entity allows to overwrite the information only if the timestamp of UE's last radio contact is newer than the one already stored. Else, it rejects the data.

Another object of the embodiments herein in to prevent massive signaling post UDR restart, and allow SOR/UPU procedures to continue in the wireless network.

Solution to Problem

Accordingly, the embodiments herein describe methods for managing a service in a wireless network. The method includes receiving, by a UDR entity, information associated with an AMF entity from a UDM entity, when the UDM entity receives a registration procedure from the AMF entity. The registration procedure comprises timestamp information associated with a UE. Further, the method includes allowing, by the UDR entity, to overwrite the information associated with the AMF entity upon determining that the timestamp information is same as previously stored timestamp information or newer than the previously stored timestamp information.

In an embodiment, the registration procedure includes a Nudm_UECM_registration procedure.

In an embodiment, the registration procedure is triggered based on one of a recovery of the UDR entity and restoration of the UDR entity after a failure of the UDR entity.

In an embodiment, the information comprises at least one of registration information and AMF identify information. The timestamp information corresponds to a last radio contact.

Accordingly, the embodiments herein describe methods for managing a service in a wireless network. The method includes sending, by an AMF entity, a registration procedure to a UDM entity, where the registration procedure comprises a restart indication to inform to the UDM entity that the registration procedure is performed upon restoration of a UDR entity. Further, the method includes performing, by the UDR entity, one of: allowing to overwrite the information upon determining that the previously stored information does contains the restart indication, or rejecting to overwrite the information upon determining that the previously stored information does not contain the restart indication.

In an embodiment, the restart indication comprises an UdrRestartInd.

Accordingly, the embodiments herein describe methods for managing a service in a wireless network. The method includes receiving, by an AUSF entity, a UDR restart notification. Further, the method includes re-synchronizing, by the AUSF entity, an authentication status to a UDM entity by sending an authentication confirmation message to the UDM entity. Further, the method includes storing, by the UDM entity, the authentication status in the UDR entity in response to receiving the authentication status from the AUSF entity.

In an embodiment, the authentication confirmation message includes a Nudm_UEAuthentication_Authentication confirmation message, where the Nudm_UEAuthentication_Authentication Confirmation message is specified in the 3GPP TS 29.503.

In an embodiment, the authentication confirmation message comprises a notification indicating that re-registering is performed upon receiving the UDR restart notification.

In an embodiment, storing, by the UDM entity, the authentication status in the UDR entity includes receiving, by a UDR entity, an authentication status data associated with an AUSF entity from a UDM entity, when the authentication status data comprises timestamp of a successful authentication event, allowing, by the UDR entity, to overwrite authentication status for an access upon determining that the timestamp information is same as a previously stored timestamp information or a newer than the previously stored timestamp information, and managing, by the UDR entity, the service in a wireless network based on the access.

In an embodiment, the access is one of a 3GPP access and a Non-3GPP access.

Accordingly, the embodiments herein describe a UDR entity for managing a service in a wireless network. The UDR entity includes a service handling controller coupled with a processor and a memory. The service handling controller is configured to receive information associated with an AMF entity from a UDM entity, when the UDM entity receives a registration procedure from the AMF entity. The registration procedure comprises timestamp information associated with a UE. The service handling controller is configured to allow to overwrite the information associated with the AMF entity upon determining that the timestamp information is same as a previously stored timestamp information or a newer than the previously stored timestamp information.

Accordingly, the embodiments herein describe an AMF entity for managing a service in a wireless network. The AMF entity includes a service handling controller coupled with a processor and a memory. The service handling controller is configured to send a registration procedure to a UDM entity, where the registration procedure comprises a restart notification to inform to the UDM entity that the registration procedure is performed upon restoration of a UDR entity. Further, the service handling controller is configured to manage the service in the wireless network based on the notification.

Accordingly, the embodiments herein describe a wireless network for managing a service. The wireless network includes UDM entity and an AUSF entity. The AUSF entity includes a service handling controller coupled with a processor and a memory. The service handling controller is configured to receive a UDR restart notification. Further, the service handling controller is configured to re-synchronize an authentication status to a UDM entity by sending an authentication confirmation message to the UDM entity. The UDM entity stores the authentication status in the UDR in response to receiving the authentication status from the AUSF entity.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1A depicts a sequence of events that take place during a typical UDR recovery procedure and the problems relating to handling of authentication data that need to be resolved, according to related art;

FIG. 1B depicts a sequence of events that take place during a typical UDR recovery procedure and the problems relating to handling of authentication data that need to be resolved, according to related art;

FIG. 2A depicts a sequence of events that take place during a typical UDR recovery procedure and the problems relating to handling of UE Location and Context data that need to be resolved, according to related art;

FIG. 2B depicts a sequence of events that take place during a typical UDR recovery procedure and the problems relating to handling of UE Location and Context data that need to be resolved, according to related art;

FIG. 3 shows various hardware components of a UDR entity, according to embodiments as disclosed herein;

FIG. 4 shows various hardware components of an AMF entity, according to embodiments as disclosed herein;

FIG. 5 shows various hardware components of an AUSF entity, according to embodiments as disclosed herein;

FIG. 6 is a flow chart illustrating a method, implemented by the UDR entity, for recovering network services after restart of UDR function, according to embodiments as disclosed herein;

FIG. 7 is a flow chart illustrating a method, implemented by the AMF entity, for recovering network services after restart of UDR function, according to embodiments as disclosed herein;

FIG. 8 is a flow chart illustrating a method, implemented by the AUSF entity, for recovering network services after restart of UDR function, according to embodiments as disclosed herein; and FIG. 9 illustrates an overview of a wireless network for recovering network services after restart of UDR function, according to embodiments as disclosed herein.

MODE FOR THE INVENTION

The 3GPP is currently studying UDR recovery procedures, which take place after UDR restart involving loss of data or data corruption takes place. Such an event results in serious degradation of the services offered to the subscribers. The 3GPP intends to specify procedures for a fifth generation core (5GC) to allow network functions (NFs) (for example, Access and Mobility Management Function (AMF) entity, Session Management Function (SMF) entity, Short Message Service Function (SMSF) entity, and so on) to re-synchronize their profiles with the UDR, so that service recovery can be expedited.

Upon learning about the UDR restart event (for example, via Network Repository Function (NRF) Notification), it is expected that the NFs (for example, the AMF entity) performs a fresh Nudm_UECM_Registration procedure, so that the UE's latest location information can be updated into the UDM entity, which then updates the same into the UDR entity. Similarly, the NFs (for example, AMF entity) are expected to perform a fresh Nudm_SDM_Get procedure to download the UE's latest subscription information, just to make sure they did not lose any notifications about subscription updates. Nudm_UECM_Registration and Nudm_SDM_Get procedures are defined in 3GPP TS 29.503.

FIG. 1A and FIG. 1B depict a sequence of events that take place during a typical UDR recovery procedure and the problems relating to handling of authentication data that need to be resolved, according to related art.

Step #1: When the UE (100) initiates a registration procedure by sending a registration request to the AMF entity (200) in a serving-network, the AMF entity (200) initiates a primary authentication procedure to verify the UE's identity. The UE (100) is then authenticated by the AUSF entity (300) in its home-PLMN.

Step #1a: Post successful authentication, the AUSF entity (300) stores the latest KAUSF which is used to derive further keys to protect the communication (for example, SoR, UPU) with the UE (100).

Step #1b: The UDM entity (400) stores the UE authentication status (success) and AUSF Instance details holding latest KAUSF into the UDR entity (500).

From now onwards, if the UDM entity (400) needs to send a SoR (Steering of Roaming) or an UPU (UE Parameter Update) information to the UE (100), it retrieves AUSF instance details from the UDR entity (500), and sends the request to the AUSF entity (300) to protect the information with latest KAUSF.

Step #2: The AMF entity (200) in the serving-network performs Nudm_UECM_Registration procedure towards the UDM entity (400) in the home-PLMN. With this procedure, the AMF entity (200) updates the UDM entity (400) that the UE (100) is now present in an area served by it.

Step #2a. Before accepting Nudm_UECM_Registration request, the UDM entity (400) first verifies if the UE (100) has been successfully authenticated in the serving-network, by checking authentication status stored in UDR entity (500) in Step #1b. If yes, it stores the UE location (for example, AMF Identity) in the UDR entity (500).

From now onwards, the AMF's identity becomes the UE's latest location information in the UDM entity (400). The UDM entity (400) uses this information for any location-specific services, and can provide the AMF's identity to other NFs who want to know the UE's location.

Step #3: The AMF entity (200) now performs Nudm_SDM_Get procedure with the UDM entity (400) to download the UE's subscription data. The AMF entity (200) also subscribes to receiving notifications from the UDM entity (400) by providing the AMF's callback address where notifications can be sent. The notifications could be about, for example, changes to the UE's subscription information.

Step #3a. The UDM entity (400) stores the AMF's callback address in the UDR entity (500). From now onwards, if there are any notifications that need to be sent to the UE (100) (for example, subscription data changes), the UDM entity (400) retrieves the AMF's callback address from the UDR entity (500) and sends notifications to this address.

Step #4: If the registration request is accepted successfully, the AMF entity (200) sends the registration accept to the UE (100) and the UE (100) sends the registration complete to the UDR entity (500).

Step #5: (The UDR entity (500) fails and restarts the UE (100)), Post recovery, it determines that it has lost some or all of its data due to for example, data corruption. Alternatively, the UDR entity (500) recovers from a data-corruption or data-loss without restarting. Post recovery, the UDR entity (500) updates the NRF entity (600) about restart, recovery-time and/or affected databases.

Step #6: The NRF entity (500) sends notification to the NFs who have subscribed to receiving UDR status events (for example, UDM, AMF). In some implementations, the UDR restart could be communicated as "UDM restart".

Step #7: The AMF entity (200) initiates the Nudm_UECM_Registration and Nudm_SDM_Get procedures towards the UDM entity (400) to re-synchronize the information with the UDR entity (500).

Step #8: Before accepting Nudm_UECM_Registration request, the UDM entity (400) wants to verify, if the UE (100) is already authenticated in the serving-network represented by the AMF entity (200).

Since the UDR entity (500) might have lost the UE's authentication status too during restart, it cannot provide the UE's last authentication status to the UDM entity (400). Thus, the UDM entity (400) does not know if it should accept Nudm_UECM_Registration Request, or reject it. If it accepts the request, it may be a security issue, as an un-authenticated UE might get access to the network. If it rejects the request, it results in the UE (100) performing fresh registration leading to lot of additional signalling, as lot of UEs will need to be perform such re-registration. Also, it is possible that a rogue Visited Public Land Mobile Network (VPLMN) can misuse this situation to its advantage, by sending Nudm_UECM_Registration request to the UDM entity (400), even though the UE (100) is not camped to its network.

Step #9: Consider another case where the SOR-AF (700) (or UDM entity (400)) needs to send the updated SoR (Steering of Roaming) information to the UE (100), or the UDM entity (400) needs to send the UPU (UE Parameter Update) information to the UE (100). The information needs to be protected with latest KAUSF.

Since the UDR entity (500) might have lost the UE's authentication status and AUSF instance details too during re-start, it cannot provide the AUSF Instance ID which holds latest KAUSF. Thus, no SoR or UPU information can be sent to the UE (100) until fresh primary authentication takes place, or the UDM entity (400)/UDR entity (500) somehow re-learns the AUSF instance holding latest KAUSF.

FIG. 2A and FIG. 2B depict the sequence of events that take place during a typical UDR recovery procedure and the problems relating to handling of UE location and context data that need to be resolved, according to related art.

Step #1: When the UE (100) initiates the registration procedure by sending registration request to the AMF entity (200) in the serving-network, the AMF entity (200) initiates the primary authentication procedure to verify the UE's identity. The UE (100) is then authenticated by the AUSF entity (300) in its home-PLMN.

Step #2: The AMF entity (200) in the serving-network performs Nudm_UECM_Registration procedure towards the UDM entity (400) in the home-PLMN. With this procedure, the AMF entity (200) updates the UDM entity (400) that the UE (100) is now present in a location-area of served by it.

Step #2a. Before accepting Nudm_UECM_Registration request, the UDM entity (400) first verifies if the UE (100) has been successfully authenticated in the serving-network, by checking authentication status stored in UDR entity (500) in Step #1. If yes, it stores the UE location (for example. AMF Identity) in the UDR entity (500).

From now onwards, the AMF's identity becomes the UE's latest location information in the UDM entity (400)/UDR entity (500). The UDM entity (400) uses this information for any location-specific services, and can provide the AMF's identity to other NFs who want to know the UE's location.

Step #3: The AMF entity (200) now performs Nudm_SDM_Get procedure with the UDM entity (400) to download the UE's subscription data. The AMF entity (200) also subscribes to receiving notifications from the UDM entity (400) by providing the AMF's callback address where notifications can be sent. The notifications could be about, for example, changes to UE's subscription information.

Step #3a. The UDM entity (400) stores the AMF's callback address in the UDR entity (500). From now onwards, if there are any notifications that need to be sent to the UE (100) (for example, subscription data changes), the UDM entity (400) retrieves the AMF's callback address from the UDR entity (500) and sends notifications to this address.

Step #4: If the registration request has been accepted successfully, the AMF entity (200) sends the registration accept to the UE (100) and the UE (100) sends the registration complete to the UDR entity (500).

Step #5: The UDR entity (500) fails and restarts. Post recovery, the UDR entity (500) determines that it has lost some or all of its data due to, for example, data corruption. Alternatively, the UDR entity (500) recovers from the data-corruption or data-loss without restarting. Post recovery, the UDR entity (500) updates the NRF entity (600) about restart, recovery-time and/or affected databases/subscribers.

Step #6: The NRF entity (600) sends notification to the NFs who have subscribed to receiving UDR status events (for example, UDM, AMF). In some implementations, the UDR restart could be communicated as "UDM restart".

Step #7: The AMF entity (200) in the network initiates Nudm_UECM_Registration and Nudm_SDM_Get procedures towards the UDM entity (400) to re-synchronize the information with the UDR entity (500), potentially for thousands of UEs which are affected by the restart.

Step #8, 8a, and 8b: While Step #7 is going on, some UEs move to an area served by another AMF (200b). This may have happened any time after Step #5. For the purpose of demonstration, let's say a UE, whose data has been lost by UDR during restart, moves from a location served by the first AMF (200a) to a location served by the second AMF entity (200b). This triggers the second AMF entity (200b) to initiate Nudm_UECM_Registration procedure towards the UDM entity (400), so that the UDM entity (400) knows that the UE (100) is now present in a location-area of served by the second AMF entity (200b). The UDM entity (400) correspondingly stores the UE's location in the UDR entity (500).

Step #8c: At this point of time, the UDM entity (400) is supposed to send a Nudm_UECM_DeregistrationNotify (cancel location) message to the first AMF entity (200a) to clear the UE's context. However, since the UDR lost the data during restart, this message cannot be sent.

Step #9: As Step #7 is still continuing, it is possible that the first AMF entity (200a) now gets a chance to update the UE's location in the UDM entity (400) due to triggering of restoration procedures in Step #5. It initiates Nudm_UECM_Registration and Nudm_SDM_Get procedures towards the UDM entity (400) to re-synchronize the information with the UDR entity (500), unaware of the fact that the UE (100) has moved out of its registration area and is no longer served by it.

Thus, even as the UE (100) is served by the second AMF entity (200b) and the first AMF entity (200a) ends up overwriting the information updated into the UDR entity (500) by the second AMF entity (200b).

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Accordingly, the embodiments herein describe methods for managing a service in a wireless network. The method includes receiving, by a UDR entity, information associated with an AMF entity from a UDM entity, when the UDM entity receives a registration procedure from the AMF entity. The registration procedure comprises timestamp information associated with a UE. Further, the method includes allowing, by the UDR entity, to overwrite the information associated with the AMF entity upon determining that the timestamp information is same as previously stored timestamp information or newer than the previously stored timestamp information.

Unlike conventional methods and systems, the proposed method can be used for recovering network services after restart of the UDR function. The proposed method can be used for recovery of UE's authentication status so as to allow the AMF to re-synchronize its data with the UDR after restart. Based on the proposed method, the UDR entity can be prevented from overwriting location data due to recent UE movement by the old location data being updated due to the UDR restoration. The AUSF can re-synchronize its data in UDR so that SoR and UPU services can be re-stored after UDR restart. The proposed method can be used to prevent massive signaling post UDR restart, and allow SOR/UPU procedures to continue in the wireless network.

In an embodiment, an AUSF entity needs to be recipient of UDR restart notifications. Thus, whenever the AUSF entity receives UDR restart notification, it can re-register the Authentication Status into UDM entity by sending Nudm_UEAuthentication_Authentication Confirmation as specified in 3GPP TS 29.503. The AUSF entity may include an indication that this re-confirmation is due to UDR restart notification.

In an embodiment, when the UDM entity provides authentication status data to the UDR entity after restart, the UDR entity verifies if the authentication data it is overwriting for a given access (3gpp or non-3gpp) is newer than the one already stored. If not, it rejects the data.

In an embodiment, when the AMF entity performs Nudm_UECM_Registration procedure due to UDR restoration, it includes a timestamp, e.g. of last radio contact with the UE. With this information, when the UDM entity stores the AMF details in the UDR entity, the UDR entity allows to overwrite the information only if the timestamp of UE's last radio contact is newer than the one already stored. Else, it rejects the data.

Embodiments herein use the following abbreviations:
a) AMF: Access and Mobility Management Function
b) UE: User Equipment
c) UDM: Unified Data Management
d) NRF: Network Repository Function
e) 3gpp: 3rd Generation Partnership Project
f) AUSF: Authentication Server Function
g) SUPI: Subscription Permanent Identifier
h) NF: Network Function
i) PLMN: Public Land Mobile Network
j) SN: Serving Network
k) UDR: Unified Data Repository
l) SMF: Session Management Function
m) SMSF: Short Message Service Function
n) KAUSF: AUSF Key Material
o) SoR: Steering of Roaming
p) UPU: UE Parameter Update
q) SOR-AF: Steering of Roaming Application Function Referring now to the drawings, and more particularly to FIGS. 3 through 9, where similar reference characters denote corresponding features consistently throughout the figures, there are shown at least one embodiment.

FIG. 3 shows various hardware components of a UDR entity (500), according to embodiments as disclosed herein. In an embodiment, the UDR entity (500) includes a processor (510), a communicator (520), a memory (530) and a service handling controller (540). The processor (510) is coupled with the communicator (520), the memory (530), and the controller service handling (540).

The service handling controller (540) is configured to receive information associated with the AMF entity (200) from the UDM entity (400), when the UDM entity (400) receives a registration procedure from the AMF entity (200). The information includes registration information and AMF identify information. The registration procedure can be a Nudm_UECM_registration procedure. The registration procedure includes timestamp information associated with the UE (100). The registration procedure is triggered based on one of a recovery of the UDR entity (500) and restoration of the UDR entity (500) after a failure of the UDR entity (500). Further, the service handling controller (540) is configured to allow to overwrite the information associated with the AMF entity (200) upon determining that the timestamp information is same as a previously stored timestamp information or a newer than the previously stored timestamp information. The timestamp information corresponds to a last radio contact.

The service handling controller (540) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (510) is configured to execute instructions stored in the memory (530) and to perform various processes. The communicator (520) is configured for communicating internally between internal hardware components and with external devices via one or more networks. The memory (530) also stores instructions to be executed by the processor (510). The memory (530) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (530) may, in some examples, be considered a non-transitory storage medium. The term "non-transitory" may indicate that the storage medium is not embodied in a carrier wave or a propagated signal. However, the term "non-transitory" should not be interpreted that the memory (530) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (510). The processor (510) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the UDR entity (500) but it is to be understood that other embodiments are not limited thereon. In other embodiments, the UDR entity (500) may include less or more number of components. Further, the labels or names of the components are used only for illustrative purpose and does not limit the scope of the invention. One or more components can be combined together to perform same or substantially similar function in the UDR entity (500).

FIG. 4 shows various hardware components of an AMF entity (200), according to embodiments as disclosed herein. In an embodiment, the AMF entity (200) includes a processor (210), a communicator (220), a memory (230) and a service handling controller (240). The processor (210) is coupled with the communicator (220), the memory (230), and the controller service handling (240).

The service handling controller (240) is configured to send a registration procedure to the UDM entity (400), where the registration procedure comprises the restart notification (e.g., UdrRestartInd) or a timestamp information associated with the UE (100) to inform to the UDM entity (400) that the registration procedure is performed upon restoration of the UDR entity (500). Based on the notification, the service handling controller (240) is configured to manage the service in the wireless network.

The service handling controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4 shows various hardware components of the AMF entity (200) but it is to be understood that other embodiments are not limited thereon. In other embodiments, the AMF entity (200) may include less or more number of components. Further, the labels or names of the components are used only for illustrative purpose and does not limit the scope of the invention. One or more components can be combined together to perform same or substantially similar function in the AMF entity (200).

FIG. 5 shows various hardware components of an AUSF entity (300), according to embodiments as disclosed herein. In an embodiment, the AUSF entity (300) includes a processor (310), a communicator (320), a memory (330) and a service handling controller (340). The processor (310) is coupled with the communicator (320), the memory (330), and the controller service handling (340).

The service handling controller (340) is configured to receive a UDR restart notification and re-synchronize the authentication status to a UDM entity (400) by sending an authentication confirmation message to the UDM entity (400). The authentication confirmation message includes a Nudm_UEAuthentication_Authentication confirmation message, where the Nudm_UEAuthentication_Authentication Confirmation message is specified in the 3GPP TS 29.503. The authentication confirmation message may include a notification indicating that re-registering is performed upon receiving the UDR restart notification.

The service handling controller (340) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (310). The processor (310) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5 shows various hardware components of the AUSF entity (300) but it is to be understood that other embodiments are not limited thereon. In other embodiments, the AUSF entity (300) may include less or more number of components. Further, the labels or names of the components are used only for illustrative purpose and does not limit the scope of the invention. One or more components can be combined together to perform same or substantially similar function in the AUSF entity (300).

FIG. 6 is a flow chart (S600) illustrating a method, implemented by the UDR entity (500), for recovering network services after restart of UDR function, according to embodiments as disclosed herein. The operations (S602 and S604) are performed by the service handling controller (540).

At S602, the method includes receiving the information associated with the AMF entity (200) from the UDM entity (400), when the UDM entity (400) receives the registration procedure from the AMF entity (200). The registration procedure comprises timestamp information associated with the UE (100). At S604, the method includes allowing to overwrite the information associated with the AMF entity (200) upon determining that the timestamp information is same as a previously stored timestamp information or a newer than the previously stored timestamp information.

FIG. 7 is a flow chart (S700) illustrating a method, implemented by the AMF entity (200), for recovering network services after restart of UDR function, according to embodiments as disclosed herein. The operations (S702 and S704) are performed by the service handling controller (240).

At S702, the method includes sending the registration procedure to the UDM entity (400), where the registration procedure comprises the restart notification to inform to the UDM entity (400) that the registration procedure is performed upon restoration of the UDR entity (500). At S704, the method includes managing the service in the wireless network (1000) based on the notification.

FIG. 8 is a flow chart (S800) illustrating a method, implemented by the AUSF entity (300), for recovering network services after restart of UDR function, according to embodiments as disclosed herein. The operations (S802-S804) are performed by the service handling controller (340).

At S802, the method includes receiving the UDR restart notification. At S804, the method includes re-synchronizing the authentication status to the UDM entity (400) by sending the authentication confirmation message to the UDM entity (400). At S806, the UDM entity (400) stores the authentication status in the UDR entity (500) in response to receiving the authentication status from the AUSF entity (300).

The various actions, acts, blocks, steps, or the like in the flow charts (S600-S800) may be performed in the order presented, in a different order or simultaneously. Further, in some embodiments, some of the actions, acts, blocks, steps, or the like may be omitted, added, modified, skipped, or the like without departing from the scope of the invention.

FIG. 9 illustrates an overview of the wireless network (1000) for recovering network services after restart of UDR function, according to embodiments as disclosed herein. In an embodiment, the wireless network (1000) includes the UE (100), the AMF entity (200), the AUSF entity (300), the UDM entity (400) and the UDR entity (500). The wireless network (1000) can be for example, but not limited to a 5G network, a 6G network and an ORAN network. The UE (100) can be for example, but not limited to a smart phone, a laptop, a desktop computer, a notebook, a Device-to-Device (D2D) device, a vehicle to everything (V2X) device, a foldable phone, a smart TV, a tablet, an immersive device, and an internet of things (IOT) device.

According to related arts (as disclosed in the FIG. 1a to FIG. 2b), since the UDR entity (500) might have lost the UE's authentication status too during restart, it cannot provide the UE's last authentication status to the UDM entity (400). Thus, the UDM entity (400) does not know if it should accept Nudm_UECM_Registration Request, or reject it. If it accepts the request, it may be a security issue, as an un-authenticated UE (100) might get access to the network. If it rejects the request, it results in the UE (100) performing fresh registration leading to lot of additional signalling, as lot of UEs will need to be perform such re-registration. Also, it is possible that a rogue VPLMN can misuse this situation to its advantage, by sending Nudm_UECM_Registration request to the UDM entity (400), even though the UE (100) is not camped to its network.

In an embodiment, an NF (for example, AMF entity (200)), while performing Nudm_UECM_Registration or Nudm_SDM_Get procedure due to UDR/UDM Restart notification, includes a flag (for example, UdrRestartInd) to indicate to the UDM entity (400) that the procedure is being performed due to a re-start notification, for example, from the NRF entity (600). The UDM entity (400) can utilize this indication to, for example, bypass Authentication Status Check. The UDM entity (400) can do so after validating that the UDR entity (500) has really restarted and that the corresponding SUPI was indeed impacted.

According to related art, when the UDM entity (400) receives Nudm_UECM_Registration request from the AMF entity (200), and it finds that it cannot get the authentication status of the UE (100) from the UDR entity (500), it accepts the Nudm_UECM_Registration request from the AMF entity (200), but provides it with a new parameter indicating:

a. The UE (100) needs to be re-authenticated upon next radio-contact b. The UE (100) needs to be re-authenticated maximum after a duration provided by the UDM entity (400) (i.e., if the UE (100) remains idle, it needs to be paged and re-authenticated).

Alternatively, according to related art, Nudm_UECM_Registration request from the AMF entity (200) is rejected with cause "REAUTHENTICATION_REQUIRED", which forces the AMF entity (200) to page and re-authenticate the UE (100). This however can potentially cause signalling storm as thousands of UEs (100) will need to be paged and re-authenticated simultaneously.

In an embodiment, an NF (for example, the AMF entity (200)), while performing Nudm_UECM_Registration procedure due to UDR/UDM Restart notification, includes a timestamp when the UE (100) was authenticated last. The UDM entity (400) can utilize this indication to, for example, bypass Authentication Status Check, if the UE (100) was authenticated recently. The UDM entity (400) can do so after validating that the UDR entity (500) has really restarted and that the corresponding SUPI was indeed impacted; and optionally after validating with the AUSF entity (300) that the UE (100) is indeed authenticated around the time as indicated by the AMF entity (200). This approach will however require that such a timestamp is stored by the AMF entity (200) in the UE-Context and transferred to the target AMF should AMF reallocation occur.

In an embodiment, upon receiving Nudm_UECM_Registration from the AMF entity (200), the UDM entity (400) may generate a random string and send the same to the UE (100) via the AMF entity (200), requesting for MAC of the message from the UE (100). The MAC is generated by the UE (100) using the Kausf, which is generated out of UE's successful primary authentication with the network. The generated MAC is sent by the UE (100) to the UDM entity (400) via the AMF entity (200), and upon receipt of the MAC from the UE (100) (via the AMF entity (200)), the UDM entity (400) requests the AUSF entity (300) to verify the same. Upon successful verification of the MAC, the UDM entity (400) considers the UE (100) is authenticated and served by the requesting AMF entity (200), responds to the AMF's Nudm_UECM_Registration request confirming the UE's registration. In an embodiment, the UDM entity (400) may alternatively request the latest SUCI from the UE (100) via the AMF entity (200), and upon response from the UE (100), it can validate if the SUCI really belongs to the user for which the AMF entity (200) is performing Nudm_UECM_Registration procedure. After confirmation, it can accept the registration request.

In an embodiment, when an NF (for example, AMF entity (200)), performs Nudm_UECM_Registration procedure due to UDR/UDM Restart notification, the UDM entity (400) checks if the AUSF entity (300) has already updated the authentication status of the UE (100) in UDM entity (400)/UDR entity (500). If not, the UDM entity (400) rejects Nudm_UECM_Registration request with a back-off timer or a busy indication, indicating to the AMF entity (200) that it should re-try after some time. If the AUSF entity (300) updates the authentication status of the UE (100) within this time, the UDM entity (400) accepts the Nudm_UECM_Registration request from the AMF entity (200) upon retry, for example, after expiry of back-off timer. Such the behavior may be valid only during UDR restoration, which may be governed by a timer.

According to related art, since the UDR entity (500) might have lost the UE's authentication status and AUSF instance details too during re-start, it cannot provide the AUSF Instance ID which holds latest KAUSF. Thus, no SoR or UPU information can be sent to the UE (100) until fresh primary authentication takes place, or the UDM entity (400)/UDR entity (500) somehow re-learns the AUSF instance holding latest KAUSF.

In an embodiment, an AUSF entity (300) too needs to be a recipient of the UDR restart notifications. Hence, the AUSF entity (300) too needs to subscribe to the UDR NF Status Change Notifications. Thus, whenever the AUSF entity (300) receives the UDR restart notification, it can re-register the Authentication Status into UDM entity (400) by sending Nudm_UEAuthentication_Authentication Confirmation as specified in 3GPP TS 29.503. The AUSF entity (300) may include an indication that this re-confirmation is due to UDR restart notification.

According to related arts, when the AUSF entity (300) re-confirms the Authentication Status into the UDM entity (400). If the UE (100) has been authenticated multiple times via multiple AUSF instances, it is possible that each AUSF instance updates UE's authentication status into the UDM entity (400), even as only one of them is the "latest". Thus, there is a possibility that the "latest" authentication status is overwritten by older status due to multiple updates.

Authentication Status data provided by the AUSF entity (300) to the UDM entity (400) includes timestamp of successful authentication event. In an embodiment, when the UDM entity (400) provides authentication status data to the UDR entity (500) after restart, the UDR entity (500) verifies if the authentication data it is overwriting for a given access (e.g., 3GPP or NON-3GPP) is newer than the one already stored. If not, it rejects the data.

According to related arts, if the UE (100) moves to a location area served by new AMF, while UDR registration procedures are going on, there is a possibility that UE's latest location data from new AMF is overwritten in the UDR by location data from old AMF.

In an embodiment, when the AMF entity (200) performs Nudm_UECM_Registration procedure due to UDR restoration, it includes a timestamp, e.g. of the last radio contact with the UE (100). With this information, when the UDM entity (400) stores the AMF details in the UDR entity (500), the UDR entity (500) allows to overwrite the information only if the timestamp of the UE's last radio contact is newer than the one already stored. Else, it rejects the data.

In an embodiment, an NF (for example, AMF entity (200)), while performing Nudm_UECM_Registration or Nudm_SDM_Get procedure due to the UDR/UDM Restart notification, includes a flag (for example, UdrRestartInd) to indicate to the UDM entity (400) that the procedure is being performed due to a re-start notification and the UDM subsequently stores the same in the UDR entity (500). In an embodiment, if another UDM instance has already updated UECM data after last restart, for example, without the restart indication, the UDR entity (500) rejects the Nudm_UECM_Registration request by sending an http error response, or a response containing notification to deregister the AMF entity (200).

In an embodiment, the UDR entity (500) rejects any fresh update of UECM data, until it is receiving restart updates from the AMF entity (200), by sending a busy response to the AMF entity (200). That is, the AMF entity (200) is not allowed to update data into the UDR entity (500) due to the UE movements, until restart data is populated in the UDM entity (400). This can be governed by a timer.

In an embodiment, when multiple AMFs provide Nudm_UECM_Registration request to the UDM entity (400) (for example, with different timestamps, for, say 3GPP access), the UDM entity (400) filters the information and stores in UDR only the latest data.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method for managing a service in a wireless network (1000), the method comprising:
   receiving, by a Unified Data Repository (UDR) entity (500), information associated with an Access and Mobility Management Function (AMF) entity (200) from a Unified data management (UDM) entity (400), when the UDM entity (400) receives a registration procedure from the AMF entity (200), wherein the registration procedure comprises timestamp information associated with a User Equipment (UE) (100); and
   allowing, by the UDR entity (500), to overwrite the information associated with the AMF entity (200) upon determining that the timestamp information is same as a previously stored timestamp information or newer than the previously stored timestamp information.

2. The method as claimed in claim 1, wherein the registration procedure comprises a Nudm_UECM_registration procedure.

3. The method as claimed in claim 1, wherein the registration procedure is triggered based on one of a recovery of the UDR entity (500) and restoration of the UDR entity (500) after a failure of the UDR entity (500).

4. The method as claimed in claim 1, wherein the information comprises at least one of registration information and AMF identify information, and wherein the timestamp information corresponds to a last radio contact.

5. A method for managing a service in a wireless network (1000), the method comprising:
   sending, by an Access and Mobility Management Function (AMF) entity (200), a registration procedure to a Unified data management (UDM) entity (400), wherein the registration procedure comprises a restart indication to inform to the UDM entity (400) that the registration procedure is performed upon restoration of a UDR entity (500); and
   performing, by the UDR entity (500), one of:
      allowing to overwrite the information upon determining that the previously stored information does contains the restart indication; or
      rejecting to overwrite the information upon determining that the previously stored information does not contain the restart indication.

6. The method as claimed in claim 5, wherein the registration procedure comprises a Nudm_UECM_registration procedure.

7. The method as claimed in claim 5, wherein the restart indication comprises an UdrRestartInd.

8. A method for managing a service in a wireless network (1000), the method comprising:
    receiving, by an Authentication Server Function (AUSF) entity (300), a UDR restart notification;
    re-synchronizing, by the AUSF entity (300), an authentication status to a UDM entity (400) by sending an authentication confirmation message to the UDM entity (400); and
    storing, by the UDM entity (400), the authentication status in a UDR entity (500) in response to receiving the authentication status from the AUSF entity (300).

9. The method as claimed in claim 8, wherein the authentication confirmation message comprises a Nudm_UEAuthentication_Authentication confirmation message, wherein the Nudm_UEAuthentication_Authentication Confirmation message is specified in the 3GPP TS 29.503.

10. The method as claimed in claim 8, wherein the authentication confirmation message comprises a notification indicating that re-registering is performed upon receiving the UDR restart notification.

11. The method as claimed in claim 8, wherein storing, by the UDM entity (400), the authentication status in the UDR entity (500) comprises:
    receiving, by the UDR entity (500), an authentication status data associated with the AUSF entity (300) from the UDM entity (400), when the authentication status data comprises timestamp of a successful authentication event;
    allowing, by the UDR entity (500), to overwrite for an access upon determining that the timestamp information is same as a previously stored timestamp information or a newer than the previously stored timestamp information; and
    managing, by the UDR entity (500), the service in the wireless network (1000) based on the access.

12. The method as claimed in claim 11, wherein the access is one of a 3rd Generation Partnership Project (3GPP) access and a Non-3GPP access.

\* \* \* \* \*